United States Patent
Lu et al.

(10) Patent No.: US 11,563,722 B2
(45) Date of Patent: Jan. 24, 2023

(54) FIREWALL COORDINATION IN A NETWORK

(71) Applicant: Hewlett Packard Enterprise Development LP, Houston, TX (US)

(72) Inventors: Hao Lu, Santa Clara, CA (US); Yan Liu, ChongQing (CN); Wei Huang, Beijing (CN); Rajini Balay, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 427 days.

(21) Appl. No.: 16/548,127

(22) Filed: Aug. 22, 2019

(65) Prior Publication Data
US 2021/0058368 A1 Feb. 25, 2021

(51) Int. Cl.
| | |
|---|---|
| H04L 9/40 | (2022.01) |
| H04L 41/12 | (2022.01) |
| H04W 12/088 | (2021.01) |
| H04W 84/12 | (2009.01) |

(52) U.S. Cl.
CPC .......... *H04L 63/029* (2013.01); *H04L 41/12* (2013.01); *H04L 63/0876* (2013.01); *H04W 12/088* (2021.01); *H04L 63/0272* (2013.01); *H04W 84/12* (2013.01)

(58) Field of Classification Search
None
See application file for complete search history.

(56) References Cited

U.S. PATENT DOCUMENTS

| 5,968,176 A | 10/1999 | Nessett et al. |
| 7,177,951 B1 * | 2/2007 | Dykeman ........... H04L 61/6004 709/238 |
| 7,317,693 B1 * | 1/2008 | Roesch ................. H04L 41/12 370/252 |

(Continued)

OTHER PUBLICATIONS

Tran et al.; "A Network Topology-aware Selectively Distributed Firewall Control in SDN"; 2015; retrieved from the Internet https://ieeexplore.ieee.org/abstract/document/7354501; pp. 1-6, as printed. (Year: 2015).*

(Continued)

*Primary Examiner* — Michael W Chao
(74) *Attorney, Agent, or Firm* — Jaffery Watson Mendonsa & Hamilton

(57) ABSTRACT

Embodiments are directed to host discovery for firewall coordination. An embodiment of a storage medium includes instructions for discovering a network topology for a network branch, the network branch including multiple access points including a first access point, the first access point having an interface to a network, the discovery of the network topology including identifying any access point that is linked to the first access point directly or via one or more intermediary access points; discovering one or more host devices that are connected by wireless or wired connections to one or more access points in the network branch; and generating a firewall coordination plan for the network branch based on the discovered network topology and the discovered one or more hosts, the firewall coordination plan including applying a firewall process for an access point to which a first host device is attached and bypassing one or more other firewall processes.

10 Claims, 9 Drawing Sheets

(56) References Cited

U.S. PATENT DOCUMENTS

| | | | |
|---|---|---|---|
| 8,336,094 B2 | 12/2012 | Litvin et al. | |
| 8,547,829 B1* | 10/2013 | Shah | H04W 76/12 370/217 |
| 9,374,285 B1* | 6/2016 | Ramasubramanian | H04L 41/12 |
| 9,882,876 B2 | 1/2018 | Cooper et al. | |
| 11,233,872 B2* | 1/2022 | Shribman | H04L 65/612 |
| 11,252,024 B2* | 2/2022 | Neginhal | H04L 41/0876 |
| 11,310,106 B2* | 4/2022 | Singla | H04W 24/08 |
| 11,425,095 B2* | 8/2022 | Popuri | H04L 63/06 |
| 2002/0059622 A1* | 5/2002 | Grove | H04L 29/12113 725/91 |
| 2002/0143960 A1* | 10/2002 | Goren | H04L 12/4641 709/229 |
| 2005/0216580 A1* | 9/2005 | Raji | G06Q 50/16 709/223 |
| 2006/0026509 A1* | 2/2006 | Porter | H04L 41/22 715/246 |
| 2007/0157313 A1* | 7/2007 | Denton | H04L 63/1433 726/22 |
| 2008/0107090 A1 | 5/2008 | Thomson et al. | |
| 2009/0122721 A1* | 5/2009 | Ko | H04L 43/10 370/254 |
| 2013/0125230 A1* | 5/2013 | Koponen | G06F 9/45533 726/13 |
| 2014/0258478 A1* | 9/2014 | Moghe | H04L 63/0209 709/220 |
| 2015/0003259 A1* | 1/2015 | Gao | H04L 43/10 370/244 |
| 2015/0172208 A1* | 6/2015 | DeCusatis | H04L 41/0866 709/226 |
| 2015/0326532 A1* | 11/2015 | Grant | H04L 63/20 726/1 |
| 2017/0099182 A1* | 4/2017 | DeBolle | H04L 63/20 |
| 2020/0136910 A1* | 4/2020 | Mishra | H04L 63/0263 |
| 2020/0274852 A1* | 8/2020 | Ahmed | H04L 63/20 |
| 2022/0166673 A1* | 5/2022 | Kompella | H04L 41/122 |
| 2022/0173985 A1* | 6/2022 | Bansal | G06F 9/45558 |
| 2022/0255799 A1* | 8/2022 | Singla | H04L 41/12 |

OTHER PUBLICATIONS

Deo, S. et al., Improving Performance of Cross Domain Firewalls in Multi-firewall System, (Research Paper), International Journal on Recent and Innovation Trends Computing and Communication, Apr. 2015, pp. 2127-2131, vol. 3, No. 4.

Yan, G. et al., Dynamic Balancing of Packet Filtering Workloads on Distributed Firewalls, (Research Paper), Mar. 25, 2008, 10 Pgs.

* cited by examiner

FIREWALL COORDINATION IN A NETWORK

BACKGROUND

In the operation of communications utilizing wireless access points in a network, each access point will generally provide firewall protection for any wired or wireless connections, thereby providing network security.

Wireless access points may be interconnected, resulting in a chain including multiple access points, with one of the access points operating as an interface for the network. In circumstances in which a client device is connected to one of the access points in a chain by a wireless or wired connection, packets from the attached device may be subjected to multiple firewalls.

However, the imposition of multiple firewalls for devices connected to a chain of access points is unnecessary, and results in signal delays and reduction in overall performance of the network.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to firewall coordination in a network.

In some embodiments, an apparatus, system, or process operates to provide for coordination of firewall protection for a chain of multiple wireless access points in a network branch, the apparatus, system, or process providing for network topology discovery to discover access point devices and links in the network branch, host discovery to discover hosts that are attached to the access points, and firewall coordination to optimize the firewall operation for the access points of the network branch.

As used herein, access point (AP) (also referred to as a wireless access point (WAP)) refers to a networking hardware device that allows devices to connect, via a wireless or wired connection, to a network, including connection to the Internet or an intranet. The AP may connect to a router (via a wired network) as a standalone device, or may be an integral component of the router itself.

Figure 1:
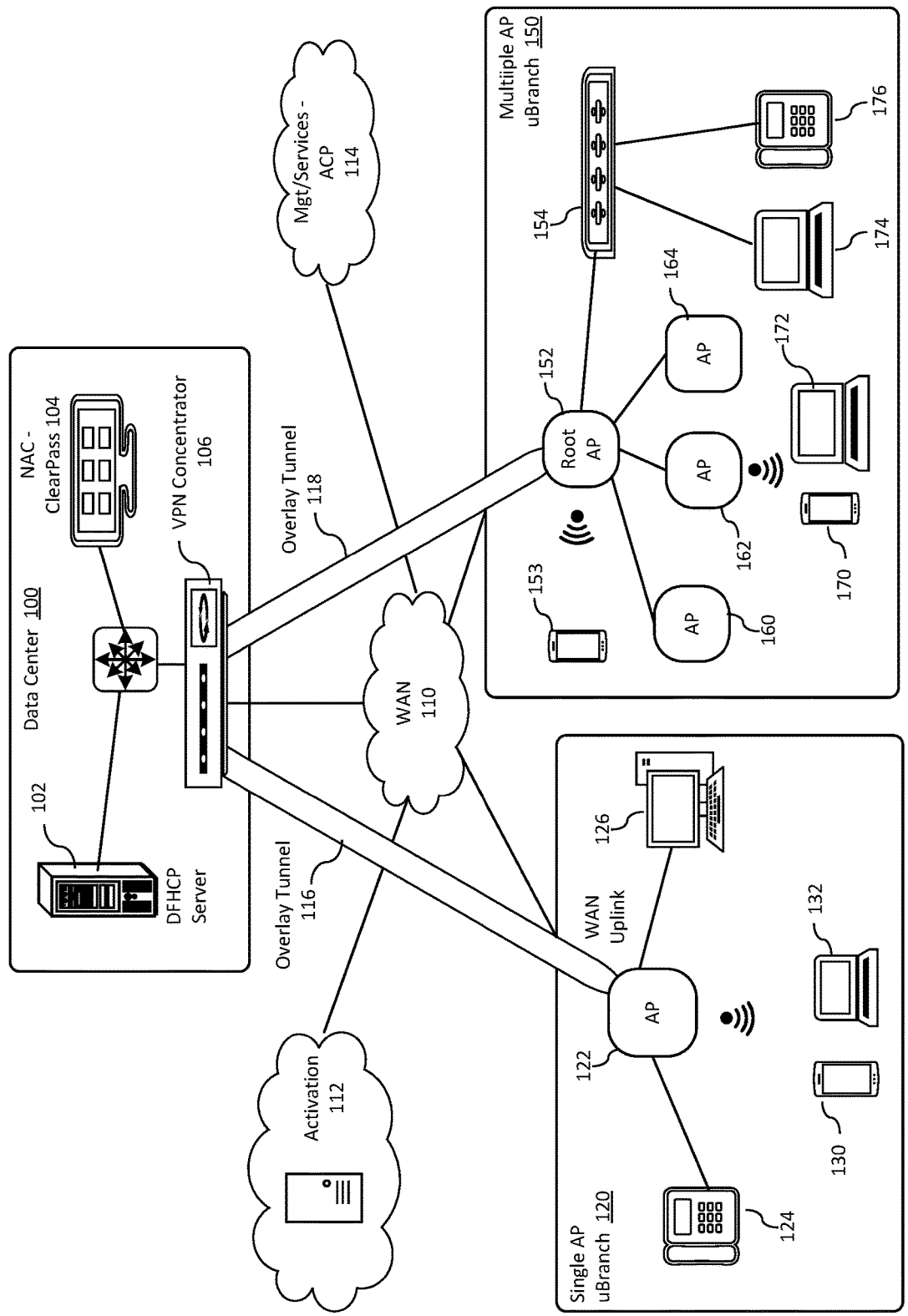
FIG. 1 is an illustration of a communication network environment including multiple wireless access in a network branch.

FIG. 1 is an illustration of a communication network environment including multiple access points in a network branch. FIG. 1 includes illustration of a data center 100, the data center 100 including a DHCP (Dynamic Host Configuration Protocol) server 102, a network access control (NAT) system that may include Aruba ClearPass 104, and a VPN (Virtual Private Network) concentrator 106. The data center 100 is connected to a WAN (Wide Area Network) 110, to which is also connected activation services 112 and network cloud management and services 114, which may include Aruba Cloud Platform (ACP).

Also connected to the network WAN 110 are one or more access points in network branches that may be referred to a microbranches (μbranch or ubranch). Within each branch there may be multiple firewall-capable devices. In a multiple firewall-capable-device network branch, user traffic may travel through multiple firewall devices before reaching the destination. A typical scenario is in an instant access point (IAP) micro-office deployment, in which typically there is only one AP operating as a WLAN-facing gateway, also known as a GAP. However, additional access points may be added behind the GAP AP to extend the coverage in the network branch. In such a network branch, only the GAP AP owns the public IP, the GAP AP providing the following network services as there is no gateway (GW) device:

DHCP service;
NAT service; and
VPN service to corporate GW/DMZ (optional).

The operation of the branch works well if there is only one access point (the GAP AP), with wireless clients connecting via wireless BSS (Basic Service Set) interfaces and wired clients connect via wired ports. As there is only one firewall device, this being the GAP AP, firewall policies will be applied on that firewall device. For example, a port-based ACL (Access Control List) can be configured for the BSS interface and the ENET1 (ENET1 and ENET0 being wired Ethernet ports to support wired network connectivity) interface, so a correct user-role can be granted to both wireless and wired clients, and this user-role will inform the GAP AP to apply the correct firewall policies to its connected clients.

For example, single AP branch 120 in FIG. 1 includes a single access point, AP 122, connected to the WAN uplink utilizing an overlay tunnel 116 for connection to the data center 100. The AP 122 includes wired connections to, for example, a telephone (such as a VoIP (Voice over Internet Protocol) telephone 124 and a PC (personal computer) 126, as well as wireless Wi-Fi connection to, for example, a cell phone 130 and laptop 132. Each of such client devices (which may also be referred to as host devices) are connected via the AP 122, which can provide firewall services for each device, whether connected wirelesly or via a wired port.

However, firewall issues arise when chaining one or more APs to the downlink wired port of the GAP. Upon connecting one downlink AP, there will be 2 firewall devices. In this case, if a client connects to the child of the GAP, all traffic from that client will be firewalled twice—first by the connected AP, and then again by the GAP AP. If more APs are added to the chain, this firewall process will be increased by the number of firewall devices in the network branch.

For example, multiple AP branch 150 includes a root access point 152 connected to the WAN uplink utilizing an overlay tunnel 118 for connection to the data center 100. In this example, the root AP 152 is connected to multiple APs, shown as AP 160, AP 162, and AP 164. (As described herein, the root AP 152 may be referred to as an uplink AP from AP 160, AP 162, and AP 164, and similarly AP 160, AP 162, and AP 164 may be referred to as downlink APs from the root AP 152.) In this structure, the root AP 152 may include wireless connections, such as to cell phone 153, and wired connections, such as to an unmanaged switch 154, providing connection to laptop 174 and telephone 176. However, the chained downlink APs may also provide connections, such as the wireless connections between AP 162 and cell phone 170 and laptop 172. In this example, cell phone 170 and laptop 172 will be firewalled twice, once at the connected AP 162 and once at the root AP 152.

Figure 2:
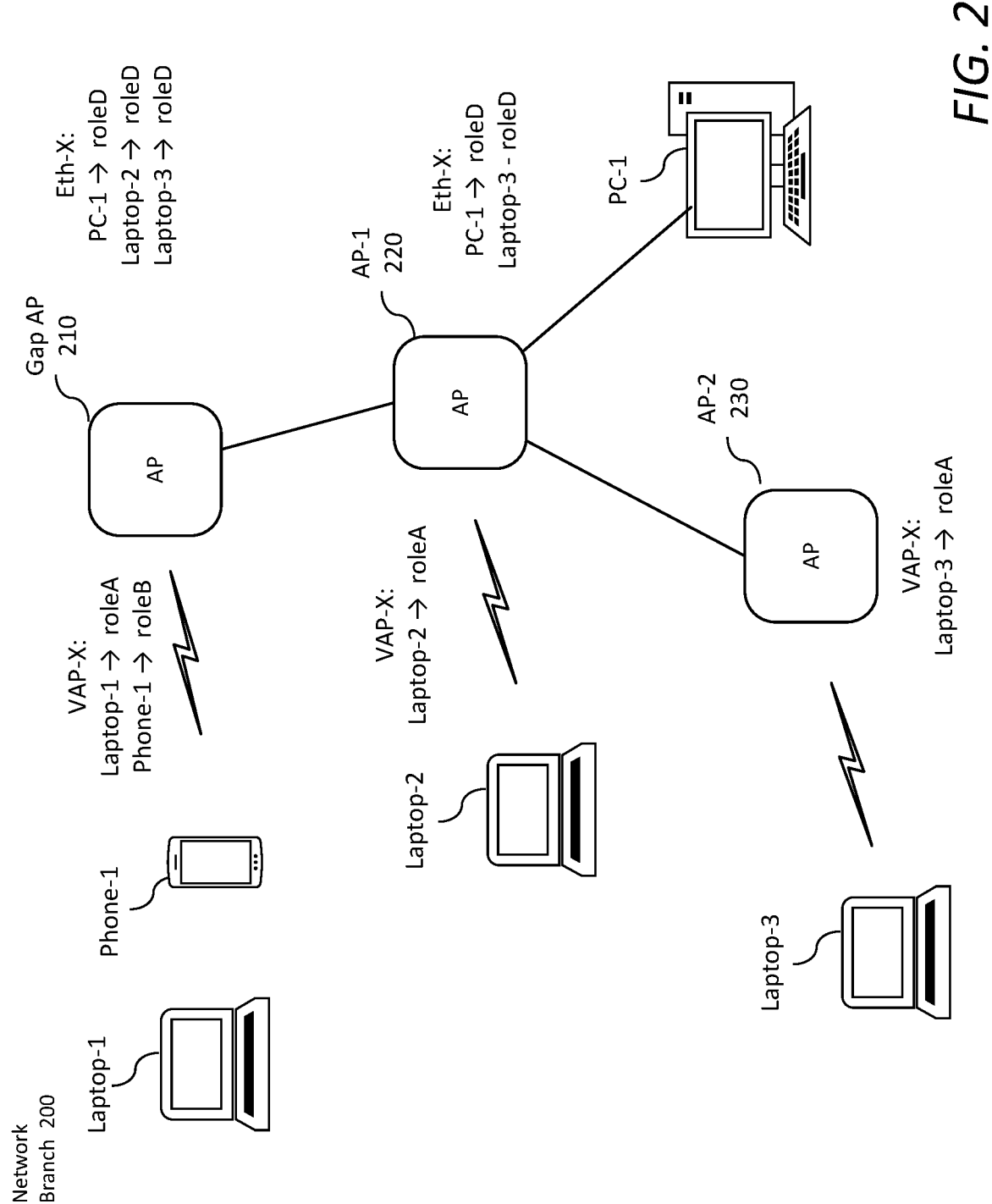
FIG. 2 illustrates a chain of access points in a branch of a network.

FIG. 2 illustrates a chain of access points in a branch of a network. As illustrated in FIG. 2, in a network branch 200 a GAP AP 210 is connected to two additional APs in a chain, AP-1 220 being connected to GAP AP 210, and AP-2 230 being connected to AP-1 220. In operation, host devices may be connected to each access point by wireless or wired connections. For example, GAP AP 210 provides wireless connections to Laptop-1 and Phone-1, AP-1 220 provides a wireless connection to Laptop-2 and a wired connection to PC-1, and AP-2 230 provides a wireless connection to Laptop-3.

However, the structure of the AP chain in network branch 200 creates a multiple firewall issue for connected devices. As illustrated, for GAP AP 210 the wireless connections (shown as VAP-X, referring to Virtual Access Points) are Laptop-1 as user-role roleA, and Phone-1 as roleB; the AP-1 220 wireless connection is Laptop-2 as roleA, together with a wired connection for PC-1; and the AP-2 230 wireless connection is Laptop-3. However, the uplink APs are not aware of the connections for downlink access points. For this reason, the Ethernet port connections (Eth-X) for AP-1 220 include Laptop-3, as well as PC-1, as roleD; and the Ethernet port connections for GAP AP 210 are PC-1, Laptop-2, and Laptop-3 as roleD. As a result, Laptop-2 will be firewalled as roleA by the connected AP-1, and will again be firewalled as roleD by the GAP AP. In general, all clients attached to an access point other than the GAP AP can be firewalled multiple times by any uplink access points. In FIG. 2, all clients attached to AP-1 will be firewalled a first time by AP-1 and a second time by the GAP AP, and all clients attached to AP-2 will be firewalled a first time by AP-2, a second time by AP-1, and a third time by the GAP AP.

However, the multiple firewalling of host devices creates unnecessary performance costs. In some embodiments, an apparatus, system, or process provides for firewall coordination between interconnected access points in a network branch such that each attached device is firewalled only by the attached AP, with firewalling in uplink APs being bypassed. In the coordination of the firewall process across the network branch, the firewall policy to be applied for each client will be based on the location. In the example illustrated in FIG. 2, for Laptop-2, user-role roleA should be enforced only on AP-1, with no further firewall process imposed on the GAP AP. This should similarly be applied for PC-1 and Laptop-3.

It is noted that it is theoretically possible to address application of multiple firewalls in an access point chain by configuring all of the wired ports of downlink APs as trusted ports, or to implement a "permit-all" role on those wired ports. However this strategy would also mean that no other wired clients can attach to those wired ports as there is no traffic restriction on such ports. Thus, in general this is not a practical solution and would introduce potential attack risks for the network.

In some embodiments, an apparatus, system, or process provides for:

(a) Network topology discovery to discover the AP devices and links in a network branch;

(b) Host discovery to discover all host devices attached to AP devices in the network branch; and (c) Firewall coordination to optimize the firewall process for the network branch based at least in part on the network topology discovery and host discovery.

In a network architecture, such as the Aruba campus to cloud (C2C) architecture, there may be a centralized cloud platform, such as the Aruba cloud platform (ACP), where the access points in a network are to be attached. The cloud platform will host certain centralized services. In some embodiments, the service components in a controller include capability to discover the attached APs in a network branch. For example, the cloud platform may include an OpenFlow Controller (OFC), OpenFlow being a communications protocol that enables network controllers to determine the path of network packets across a set of switches. OFC utilizes OpenFlow Topology Discovery Protocol (OFDP) to discover all the attached APs and links between such APs. However, this discovery of the network topology of the network branch does not include the discovery of hosts that are connected to such APs.

It is noted that there are some technologies that use OpenFlow to provide packet out messages including an ARP (Address Resolution Protocol) request on the switchport, and then providing the ARP reply. In this way, the OFC controller can potentially identify hosts. However, there are significant limitations to this approach:

(a) The ARP frame needs to be sent on each edge port to each edge network device, which would require a large number of ARP frames. For example, if an ARP frame is sent through ethernet 1 of the GAP AP, the frame could be broadcast to all other APs; and (b) In order to construct the ARP request, it is necessary to know the destination IP address (dst_ip), and this cannot be obtained unless the ARP is sent for each possible IP, which generally is not practical.

In some embodiments, a Host Discovery Service (HDS) utilizes existing Wi-Fi operation together with MAC authentication fall through to discover hosts that are attached to access points in a network branch. Based on both OFDP and HDS, it is then possible over time to identify the complete network topology for a branch of a network, including the APs in the network branch, the links between the APs, the IP and MAC addresses of the hosts, and the ports to which the hosts are connected. This information can then be utilized to enable the coordination of firewalls through the access points of the network branch.

Discovering a Wi-Fi wireless client at an access point is generally a straightforward operation. When a Wi-Fi client connects to an access point, there is an association request. The AP maintains a Wi-Fi station table (per virtual AP). In some embodiments, each AP can synchronize this information to the HDS, which provides attachment information for each AP in a network branch.

However, the process is more complicated for a wired client. Because there is no such association requirement for a wired client, it is not possible to know whether a wired client is a directly connected host, or is instead a client connected to a downlink access point. It is possible in theory to create a wired user whenever an AP sees frames from a new source MAC, with the AP maintaining a wired user table. However, the AP may also receive frames from adjacent APs. For example, in FIG. 2 the GAP AP 210 can see the frames from PC-1 as does AP-1 220, and thus it is necessary to determine which AP a particular host is actually attached to.

Figure 3A:
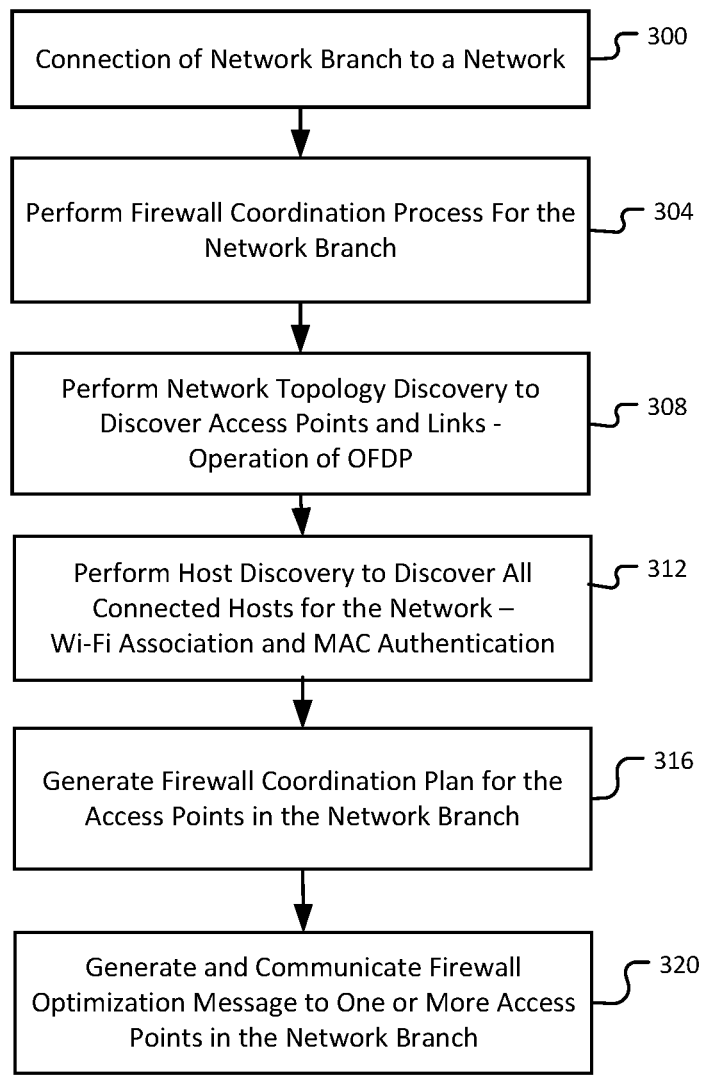
FIG. 3A is a flow chart to illustrate a process for providing firewall coordination in a network branch including multiple connected access points according to some embodiments.

FIG. 3A is a flow chart to illustrate a process for providing firewall coordination services for a network branch including multiple connected access points according to some embodiments. In some embodiments, a network branch including one or more access points, including a GAP (network facing) access point, is attached to a network 300. This may include, for example, GAP AP 210 illustrated in FIG. 2 receiving cloud network management and services. A firewall coordination process is initiated for the network branch 304. The process for firewall coordination in a network branch may be triggered by, for example, the connection of the network branch to the network, or the passage of a certain amount of time since a prior process or a reset event.

In some embodiments, the firewall coordination process then proceeds with performance of network topology discovery by a service to discover all access points and links in the network branch using cloud network services 308. For example, a cloud platform may include OFC, wherein OFC utilizes OFDP to discover all the attached APs and links between such APs.

The process further includes performing a host discovery process to discover all hosts connected to the network branch utilizing Wi-Fi association and MAC authentication fall through 312. In some embodiments, a host discovery service (HDS) may more specifically include the following:

(a) If a wireless client connects to any AP, the AP will send a message (which may be referred to herein as a UserMiss message) to HDS, with the message including 1 client MAC address, a unique identifier for the AP (such as, for example, the AP MAC address), and the Port ID. The HDS can determine that a client is a wireless client, and thus knows where this client is attached. For example, in FIG. 2, the HDS would discover that GAP AP 210 has two wireless clients—Laptop-1 and Phone-1; AP-1 has one wireless client—Laptop-2; and AP-2 has one wireless client—Laptop-3.

(b) If a wired client connects to the wired port of any AP, the AP will send a MAC authentication request (macauth.req) to HDS, with the message including client MAC address, AP MAC address, and Port ID. Because this is a MAC authentication, the client will be blocked until a MAC authentication response (macauth.resp) is received, which must occur prior to an authentication timeout.

(c) HDS is to determine where the client is attached based on the MAC authentication request, and will reply to the AP with an acceptance message (macauth.accept). Once AP receives the acceptance message, the AP is to unblock the client, and then traffic can pass through. For example, in FIG. 2 HDS will learn that PC-1 is attached to AP-1.

(d) After this point, it is expected that certain data packets triggering action will still be received at the GAP AP. For example, Laptop-2 and PC-1 in FIG. 2 may trigger a similar MAC authentication request to HDS as the first data frame reaches the GAP AP 210. At this time, HDS may look up a database containing host connection information and determine that these devices are already attached to AP-1, and then can simply ignore the message.

(e) A UserMiss message triggered by a wireless client could potentially reach HDS after a macauth.request from the uplink AP. In this case, HDS will ignore this MAC authentication request and conclude that the wireless client is not attached to the uplink AP. It is noted that this scenario will not occur for a wired client because no data frame could be sent to a uplink AP unless an macauth.accept (or timeout) has reached the attached AP.

(f) In some embodiments, each AP will send a message (which may be referred to herein as a UserSync message) to HDS (wherein the message may be sent periodically or upon occurrence of certain events) to keep the attached devices alive for purposes of firewall optimization. Within this message, the AP may, for example, include all attached clients (providing client MAC+client IP+AP MAC+port-id). If the HDS determines that a certain client is not refreshed within a certain period of time (e.g., with a 3-minute timeout period), the HDS is to age out that client in the database, thus removing the client from the firewall coordination.

Based on the above, the HDS will over time discover all clients on the network, with the information being shared with the Firewall Coordinate Service (FCS). Based at least in part on the discovered network topology and the discovered hosts connected to the network, a firewall coordination plan is generated for the access points in the network branch 316. The generated firewall coordination plan is to provide for coordination of the firewall devices in the network branch such that communications from a connected host device are firewalled at the access point to which the device is connected (by wireless or wired connection), with firewalls to be bypassed at any uplink access point from the connected access point.

In some embodiments, a firewall optimization message is generated and communicated by the FCS to one or more access points in the network 320, the firewall optimization message being based on the firewall coordination plan for the network branch. For example, as in FIG. 2, a firewall optimization message may be sent to GAP AP 210 instructing the GAP AP to skip the firewall process for the three host devices connected to AP-1 (Laptop-2, Laptop-3, and PC-1). Similarly, clients connected to AP-2 can be classified in the same way, and a firewall optimization message being generated and sent to both GAP AP and AP-1 for the same optimizations.

Figure 3B:
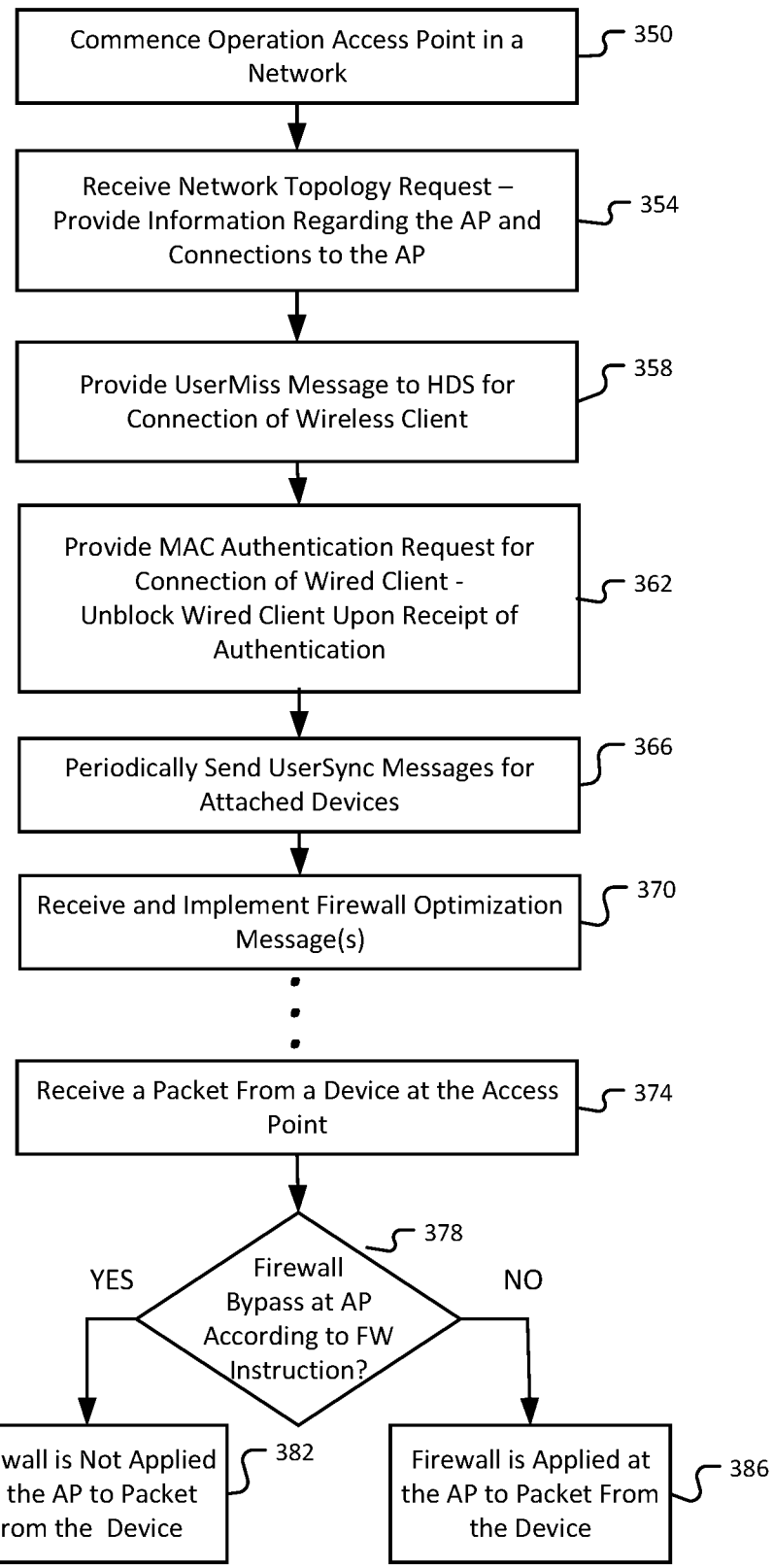
FIG. 3B is a flow chart to illustrate a process for an access point to provide firewall optimization according to some embodiments.

FIG. 3B is a flow chart to illustrate a process for an access point to provide firewall optimization according to some embodiments. In some embodiments, an access point may be a GAP (network facing) access point or an access point connected in a chain to the GAP AP. In some embodiments, upon the access point commencing operation 350, the access point may receive one or more network topology requests to provide information regarding the access point and connections to the access point 354. This data may be utilized discovering the network topology for the network branch, such as provided by 308 in FIG. 3A. In response, the AP is to provide information regarding the AP and connections to the AP.

In some embodiments, in response to a wireless client being connected to the AP, the AP is to provide a UserMiss Message to a Host Discovery Service (HDS) 358. Further, in response to a wired client being connected to the AP, the AP is to provide a MAC authentication request for the wired client 362. With the MAC authentication request, the AP is to block the client, and then unblock the client only upon receiving an authentication response. Further, to maintain the status of connected devices, the AP is to send UserSync messages (or other similar message, command, or announcement) for the devices attached to the AP 366.

In some embodiments, the AP may receive and implement firewall optimization messages 370. The messages may include instruction to the AP to bypass firewall application for devices that are confirmed to be connected to one or more downlink APs, the downlink APs to handle the firewall service for such devices. The optimization messages may further include instructions to, for example, commence applying the firewall to all communications in certain circumstances, such as when there are any security concerns for the network. In some embodiments, the firewall optimization messages may include an expiration date.

In some embodiments, upon receiving a packet from a particular device at the access point 374, the access point is to determine whether one or more firewall optimization messages indicate that firewalling should be bypassed at the AP for the particular device 378. If so, the AP does not apply a firewall to the packet from the device 382, and, if not, the AP is to apply the firewall to the packet from the device 386. In this way the fallback to the firewall optimization, such as when optimization hasn't been completed, has expired, or fails in any way, is to apply the normal firewall at each AP, thus insuring application of security in the connections to the network in the network branch.

Figure 4A:
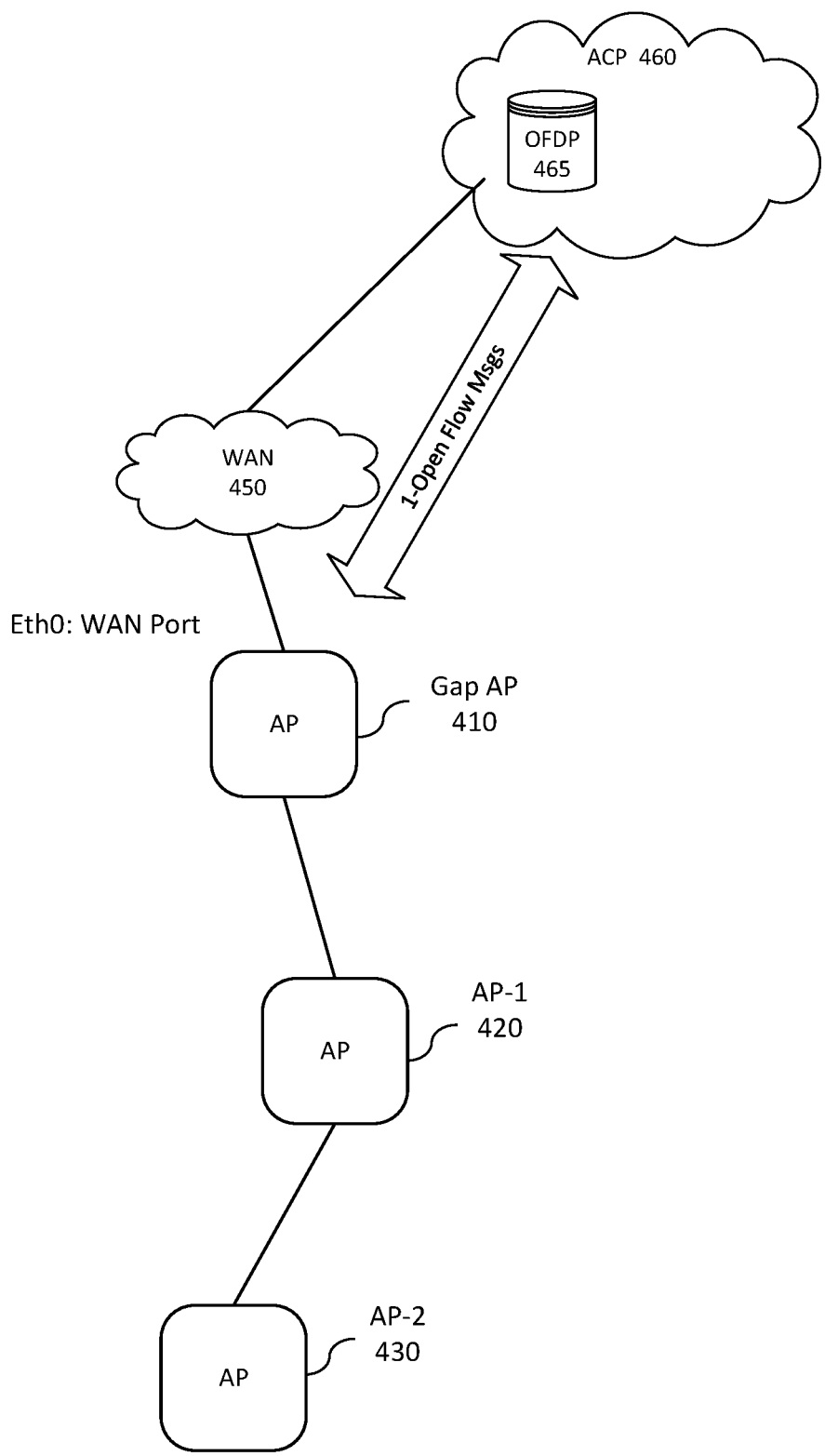
FIG. 4A illustrates discovery of access points and links in a network branch according to some embodiments.

FIG. 4A illustrates discovery of access points and links in a network branch according to some embodiments. In FIG. 4A, a network branch includes a GAP AP 410 having an interface with the WAN 450. There may be a chain of access points connected to the GAP AP 410, shown in FIG. 4A as AP-1 420 connected to the GAP AP, and AP-2 430 connected to AP-1. This particular structure is only an example, and a chain of access points may include more access points, and may include sub-branches from access points.

In some embodiments, network cloud services are provided for the network, such as ACP 460 including OFDP 465, enabling the transfer of OpenFlow messages for the network services. In some embodiments, OFDP is to discover all access points and the links between these. Thus, the chain of access points is discovered as illustrated in FIG. 4A.

Figure 4B:
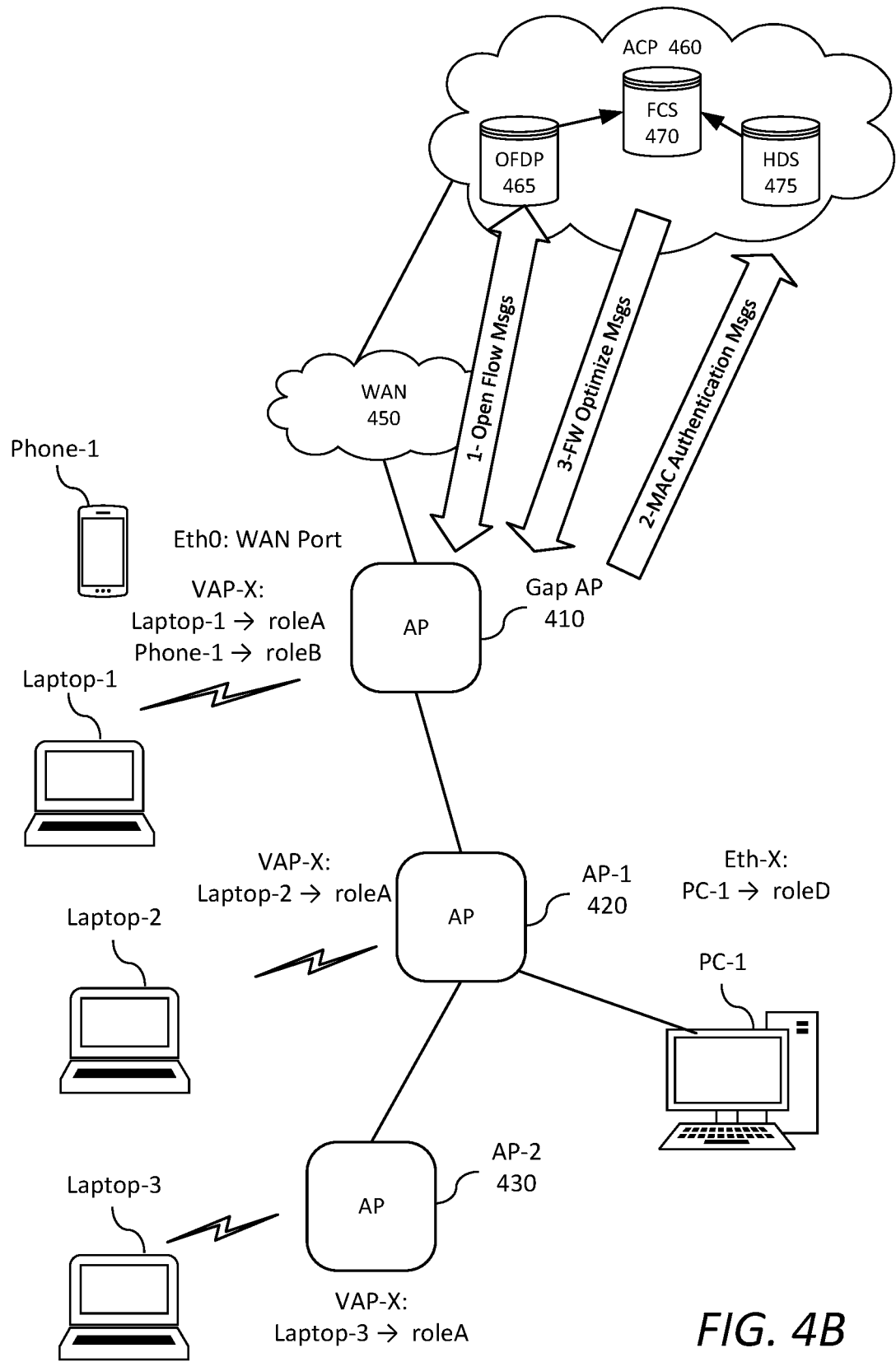
FIG. 4B illustrates discovery of hosts that are connected to access points in a network branch according to some embodiments.

FIG. 4B illustrates discovery of hosts that are connected to access points in a network branch according to some embodiments. In FIG. 4B, a network branch again includes a GAP AP 410 having an interface with the WAN 450, with a chain of access points being connected to the GAP AP 410, these being AP-1 420 connected to the GAP AP, and AP-2 430 connected to AP-1. In this example, each access point may include one or more wireless and wired clients, such as Phone-1 and Laptop-1 connected wirelessly to GAP AP 410; Laptop-2 connected wirelessly and PC-1 connected wired to AP-1 420; and Laptop-3 connected wirelessly to AP-2 430.

In some embodiments, network cloud services including a Host Discovery Service (HDS) are further to provide for discovery of all hosts attached to the APs in the network using utilizing Wi-Fi association and MAC authentication fall through, such as illustrated and described as element 312 in FIG. 3A. As shown in FIG. 4B, MAC authentication messages are transmitted from the access points to the HDS.

In some embodiments, a Firewall Coordination Service (FCS) 470 is to receive the information regarding the discovered network topology (as provided in FIG. 4A) and the hosts attached to the network to generate a firewall coordination plan based at least in part on such information. The FCS 470 then is to transmit firewall optimization messages to the access points in the network, the messages to identify which devices are not to be firewalled because such devices are connected to and firewalled by a downlink access point.

Figure 5:
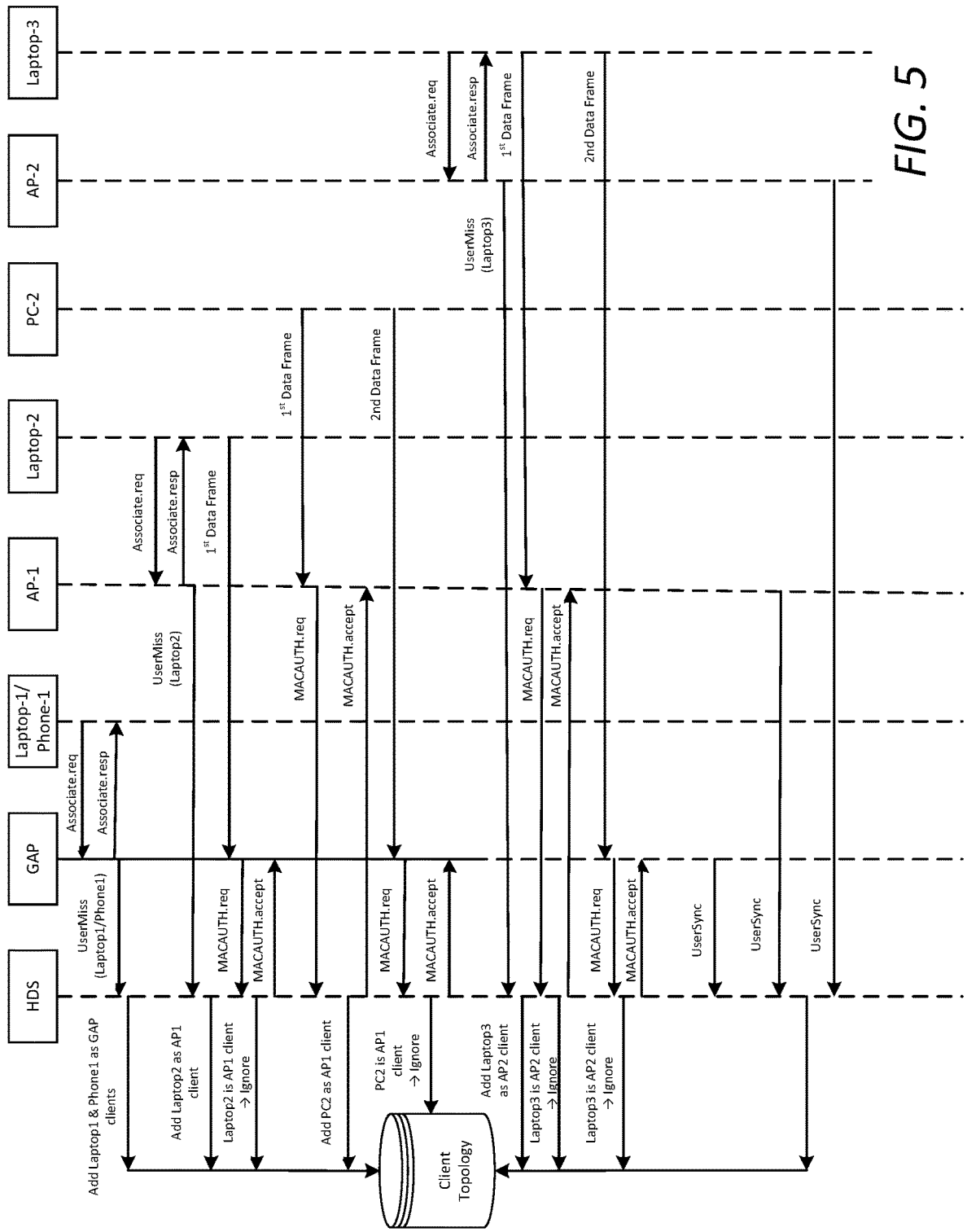
FIG. 5 is a diagram to illustrate exchange of signals in a process for discovery of connected clients in firewall coordination according to some embodiments.

FIG. 5 is a diagram to illustrate exchange of signals in a process for discovery of connected clients in firewall coordination according to some embodiments. The diagram includes signals for the network example illustrated in FIG. 2 and FIG. 4B, including the HDS; the GAP AP; Laptop-1 and Phone-1 with wireless connections to GAP AP; AP-1 connected to GAP AP; Laptop-2 with wireless connection to AP-1; PC-1 with wired connect to AP-1; AP-2 connected to AP-1; and Laptop-3 with wireless connection to AP-2. FIG. 5 illustrates the signals to provide for discovering and adding each client to generate a client topology, and providing UserSync messages to maintain the status of such clients.

Figure 6:
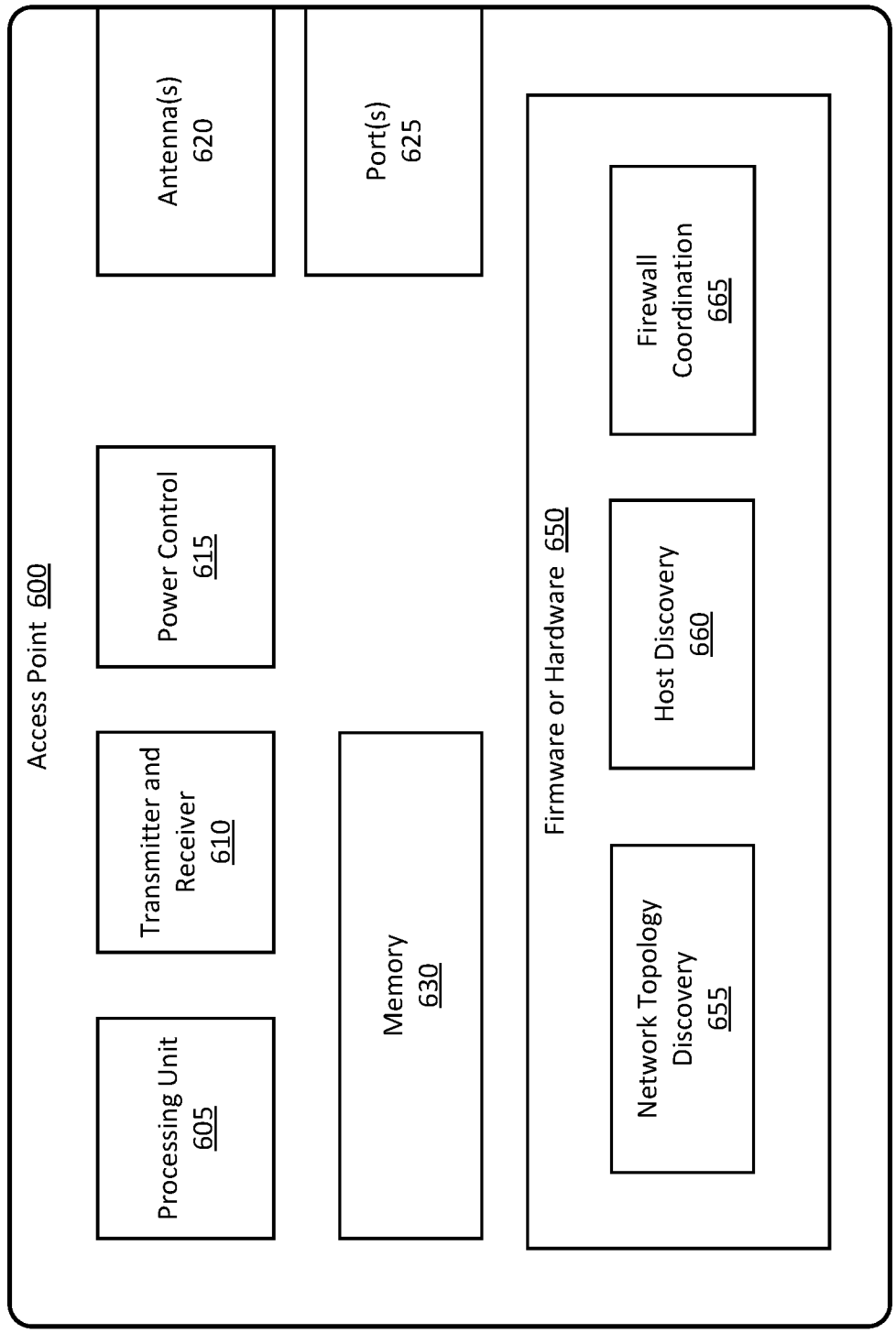
FIG. 6 is a block diagram to illustrate an access point to provide firewall optimization in according to some embodiments.

FIG. 6 is a block diagram to illustrate an access point to provide firewall optimization in according to some embodiments. An access point includes additional components and elements not illustrated in FIG. 6, which is simplified for sake of illustration. The illustrated access point 600 may include an access point operating under one or more IEEE (Institute of Electrical and Electronic Engineers) 802.11 standards, and may include an access point 210, 220, 230 illustrated in FIG. 2 in a network including a chain of multiple access points. In some embodiments, the access point provides for firewall optimization operations as illustrated in FIGS. 3A, 3B, 4A, 4B, and 5.

In some embodiments, the access point 600 includes a processing unit 605, a transmitter and receiver 610, power control 615, one or more antennas 620 for wireless signal communication, and one or more ports 625 for network connections or other connections. The access point 600 may further include memory 630 for storage of data, which may include volatile and nonvolatile memory (including flash memory and similar elements), registers, and other storage technologies. The memory 630 may include storage of data, including firewall optimization data.

In some embodiments, the access point 600 further includes firmware or hardware or both 650 that include network topology discovery 655, host discovery 660, and firewall coordination 665. In some embodiments, the firmware or hardware 650 is to provide assistance to OFDP 465 (as illustrated in FIGS. 4A and 4B) in network topology discovery, and assistance to HDS 475 (as illustrated in FIG. 4B) in host discovery. Further, the firmware or hardware 650 is to provide for firewall optimization in response to receipt of firewall optimization messages from FCS 470 in FIG. 4B. In some embodiments, the firmware or hardware 650 is to provide operations for network topology discovery, host discovery, and firewall optimization as illustrated in FIG. 3B.

Figure 7:
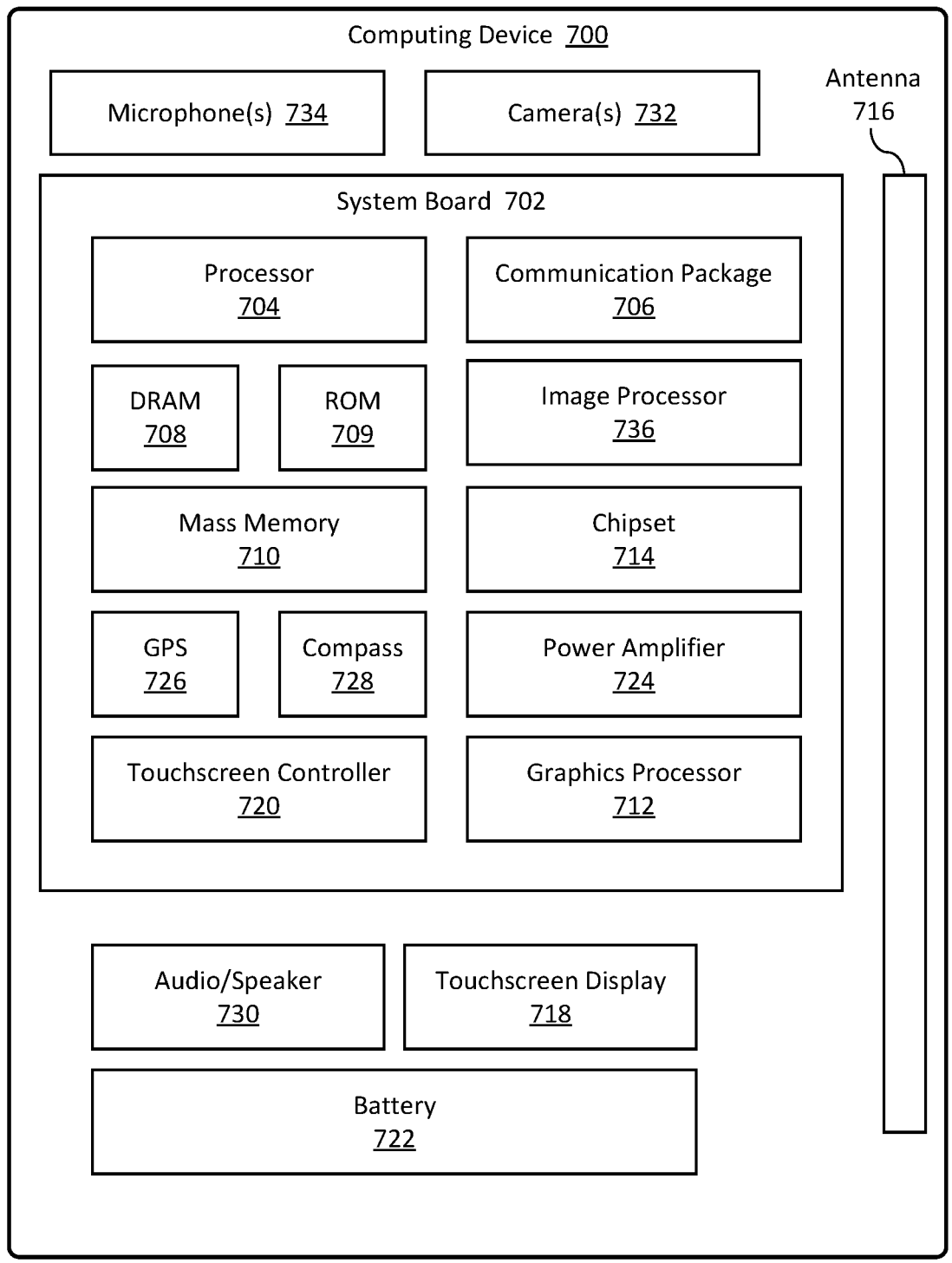
FIG. 7 illustrates a computing device according to some embodiments.

FIG. 7 illustrates a computing device according to some embodiments. In some embodiments, the computing device may include a host device connected to an access point in a network, such as, for example, the devices connected to access points in FIGS. 2 and 4B. Computing device 700 includes a system board 702 (which may also be referred to as a motherboard, main circuit board, or other terms). The board 702 may include a number of components, including but not limited to a processor 704 and at least one communication package or chip 706. The communication package 706 is coupled to one or more antennas 716. The processor 704 is physically and electrically coupled to the board 702.

Depending on its applications, computing device 700 may include other components that may or may not be physically and electrically coupled to the board 702. These other components include, but are not limited to, volatile memory (e.g., DRAM) 708, nonvolatile memory (e.g., ROM) 709, flash memory (not shown), a graphics processor 712, a digital signal processor (not shown), a crypto processor (not shown), a chipset 714, an antenna 716, a display 718 such as a touchscreen display, a touchscreen controller 720, a battery 722, an audio codec (not shown), a video codec (not shown), a power amplifier 724, a global positioning system (GPS) device 726, a compass 728, an accelerometer (not shown), a gyroscope (not shown), a speaker or other audio element 730, one or more cameras 732, a microphone array 734, and a mass storage device (such as hard disk drive) 710, compact disk (CD) (not shown), digital versatile disk (DVD) (not shown), and so forth). These components may be connected to the system board 702, mounted to the system board, or combined with any of the other components.

The communication package 706 enables wireless and/or wired communications for the transfer of data to and from the computing device 700, which may be in communication with an access point. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 706 may implement any of a number of wireless or wired standards or protocols, including but not limited to Wi-Fi (IEEE 802.11 family), WiMAX (IEEE 802.16 family), IEEE 802.20, long term evolution (LTE), Ev-DO (Evolution Data Optimized), HSPA+, HSDPA+, HSUPA+, EDGE Enhanced Data rates for GSM evolution), GSM (Global System for Mobile communications), GPRS (General Package Radio Service), CDMA (Code Division Multiple Access), TDMA (Time Division Multiple Access), DECT (Digital Enhanced Cordless Telecommunications), Bluetooth, Ethernet derivatives thereof, as well as any other wireless and wired protocols that are designated as 3G, 4G, 5G, and beyond. The computing device 700 may include a plurality of communication packages 706. For instance, a first communication package 706 may be dedicated to shorter range wireless communications such as Wi-Fi and Bluetooth and a second communication package 606 may be dedicated to longer range wireless communications such as GSM, EDGE, GPRS, CDMA, WiMAX, LTE, Ev-DO, and others.

In various implementations, the computing device 700 may be a laptop, a netbook, a notebook, an Ultrabook, a smartphone, a tablet, a personal digital assistant (PDA), an ultra-mobile PC, a mobile phone, a desktop computer, a server, a set-top box, a VoIP telephone, an entertainment control unit, a digital camera, a portable music player, or a digital video recorder. The computing device may be fixed, portable, or wearable. In further implementations, the computing device 700 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

The following clauses and/or examples pertain to further embodiments or examples. Specifics in the examples may be applied anywhere in one or more embodiments. The various features of the different embodiments or examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to embodiments and examples described herein.

In some embodiments, a storage medium includes instructions for discovering a network topology for a network branch, the network branch including a plurality of access points including a first access point, the first access point having an interface to a network, the discovery of the network topology including identifying any access point of the plurality of access points that is linked to the first access point directly or via one or more intermediary access points; discovering one or more host devices that are connected by wireless or wired connections to one or more access points in the network branch; and generating a firewall coordination plan for the network branch based on the discovered network topology and the discovered one or more hosts, the firewall coordination plan including applying a firewall process for an access point to which a first host device is attached and bypassing one or more other firewall processes for access points in a connection between the first host and the network.

In some embodiments, an access point includes a processor; a transmitter and receiver for wireless communication for a network; one or more ports for wired communications for the network; and firmware including network topology discovery, host discovery, and firewall coordination, wherein the access point is to transmit information regarding the access point and connections to the access point in response to a network topology request, transmit a message upon a wireless connection of a host device to the access point, transmit an authentication request upon a wired connection of a host device to the access point, and, upon receiving a firewall optimization message identifying one or more host devices, bypassing application of a firewall for packets from any of the one or more devices.

In some embodiments, a method for firewall optimization includes discovering a network topology for a network branch, the network branch including a plurality of access points including a first access point, the first access point having an interface to a network, the discovery of the network topology including identifying any access point of the plurality of access points that is linked to the first access point directly or via one or more intermediary access points; discovering one or more host devices that are connected by wireless or wired connections to one or more access points in the network branch; and generating a firewall coordination plan for the network branch based on the discovered network topology and the discovered one or more hosts, the firewall coordination plan including applying a firewall process for an access point to which a first host device is attached and bypassing one or more other firewall processes for access points in a connection between the first host and the network.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. One or more non-transitory computer-readable storage mediums having stored thereon executable computer program instructions that, when executed by one or more processors, cause the one or more processors to perform operations comprising:
    performing a network topology protocol to discover a network topology for a network branch based on data packets received from the network branch, the network branch including a plurality of access points including a first access point, the first access point having an interface to a network, discovery of the network topology including identifying any access point of the plurality of access points that is linked to the first access point directly or via one or more intermediary access points;
    performing a host discovery service to discover, based on data packets received from the network branch, one or more host devices that are connected by wireless or wired connections to one or more access points of the plurality of access points in the network branch;
    generating a firewall coordination plan for the network branch based on the discovered network topology and the discovered one or more host devices;
    applying a firewall policy for a second access point to which a first host device is attached and bypassing one or more other firewall policies for access points in a connection between the first host and the network, wherein the firewall policy for the second access point is based on the generated firewall coordination plan; and
    generating and transmitting a firewall optimization message to a particular access point of the plurality of access points, the firewall optimization message to identify one or more host devices for which a firewall is not required at the particular access point, wherein the firewall optimization message is based on the generated firewall coordination plan.

2. The one or more mediums of claim 1, wherein the network topology protocol comprises a OpenFlow Topology Discovery Protocol (OFDP).

3. The one or more mediums of claim 1, wherein the performing a host discovery service to discover the one or more host devices that are connected by wireless or wired connections to the one or more access points comprises:
    receiving and processing messages from one or more access points regarding one or more host devices connected by wireless connection; and
    receiving and processing authentication requests from one or more access points regarding one or more host devices connected by wired connections.

4. The one or more mediums of claim 1, wherein a firewall is to be applied at an access point to which the identified one or more host devices are attached, the access point to which the identified one or more host devices are attached being a downlink access point from the particular access point receiving the firewall optimization message.

5. The one or more mediums of claim 1, further comprising executable computer program instructions that, when executed by the one or more processors, cause the one or more processors to perform operations comprising:

removing one or more host devices from a database of discovered host devices upon expiration of a period of time since a message regarding the host device has been received from an access point.

6. A method for firewall optimization comprising:

performing a network topology protocol to discover a network topology for a network branch based on data packets received from the network branch, the network branch including a plurality of access points including a first access point, the first access point having an interface to a network, discovery of the network topology including identifying any access point of the plurality of access points that is linked to the first access point directly or via one or more intermediary access points;

performing a host discovery service to discover, based on data packets received from the network branch, one or more host devices that are connected by wireless or wired connections to one or more access points of the plurality of access points in the network branch;

generating a firewall coordination plan for the network branch based on the discovered network topology and the discovered one or more host devices;

applying a firewall policy for a second access point to which a first host device is attached and bypassing one or more other firewall policies for access points in a connection between the first host and the network, wherein the firewall policy for the second access point is based on the generated firewall coordination plan; and generating and transmitting a firewall optimization message to a particular access point of the plurality of access points, the firewall optimization message to identify one or more host devices for which a firewall is not required at the particular access point, wherein the firewall optimization message is based on the generated firewall coordination plan.

7. The method of claim 6, wherein the network topology protocol comprises a OpenFlow Topology Discovery Protocol (OFDP).

8. The method of claim 6, wherein the performing a host discovery service to discover the one or more host devices that are connected by wireless or wired connections to the one or more access points comprises:

receiving and processing messages from one or more access points regarding one or more host devices connected by wireless connection; and receiving and processing authentication requests from one or more access points regarding one or more host devices connected by wired connections.

9. The method of claim 6, wherein a firewall is to be applied at an access point to which the identified one or more host devices are attached, the access point to which the identified one or more host devices are attached being a downlink access point from the particular access point receiving the firewall optimization message.

10. The method of claim 6, further comprising:

removing one or more host devices from a database of discovered host devices upon expiration of a period of time since a message regarding the host device has been received from an access point.

* * * * *